May 30, 1944. W. SMITH, JR 2,350,078
DOMESTIC APPLIANCE
Filed Sept. 18, 1939 3 Sheets-Sheet 1

INVENTOR
William Smith Jr.
BY Spencer Hardman and Fehr
ATTORNEYS

May 30, 1944. W. SMITH, JR 2,350,078
DOMESTIC APPLIANCE
Filed Sept. 18, 1939   3 Sheets-Sheet 2
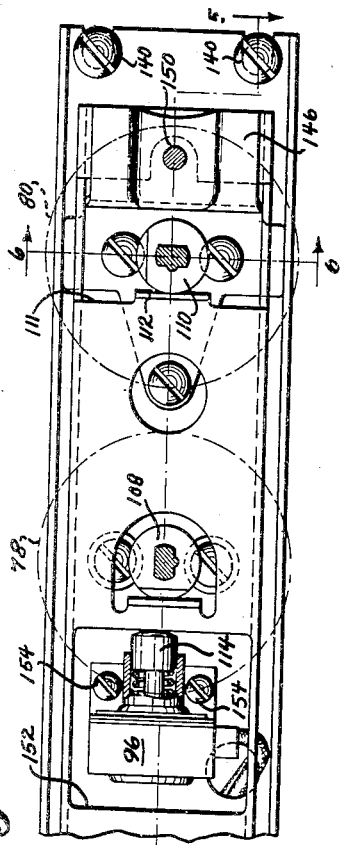
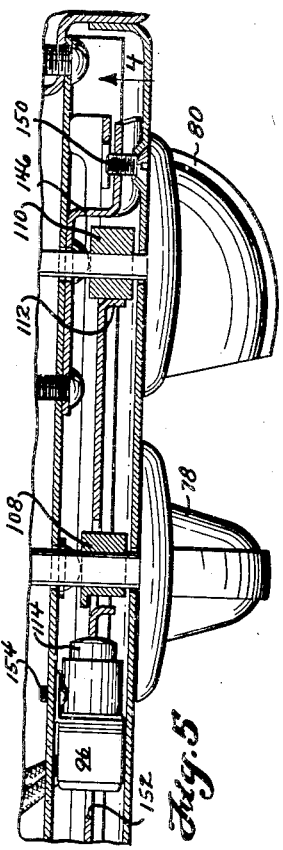
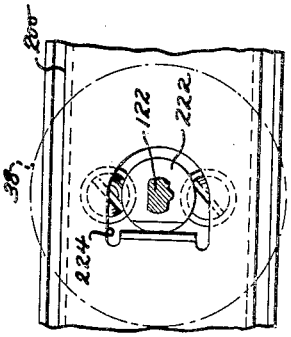
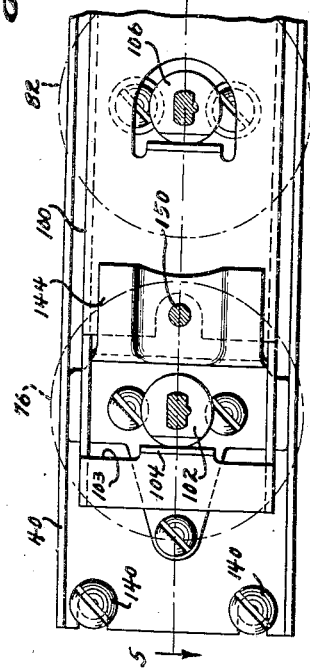
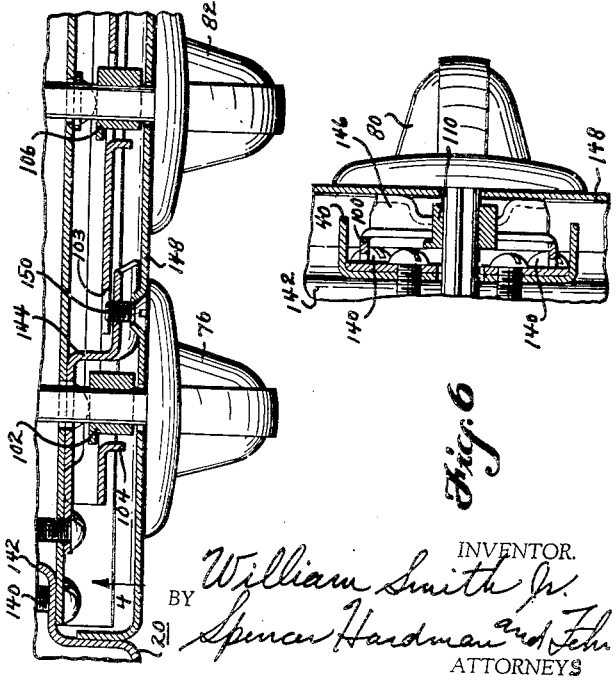
INVENTOR.
William Smith Jr.
BY Spencer Hardman and Fehr
ATTORNEYS Patented May 30, 1944

2,350,078

UNITED STATES PATENT OFFICE 2,350,078

DOMESTIC APPLIANCE

William Smith, Jr., Dayton, Ohio, assignor to General Motors Corporation, Dayton, Ohio, a corporation of Delaware Application September 18, 1939, Serial No. 295,428

5 Claims. (Cl. 177—311)

This invention relates to a domestic appliance and more particularly to indicating devices for electric ranges and the like.

In order to provide a visible indication that commands attention when one or more of the heating units of an electric range are energized it is desirable to provide a pilot or indicating light. It is impractical to employ an electrical arrangement wherein a single pilot light may be used to indicate the energizing of any one or more of the separate heating units of an electric range.

It is an object of my invention to provide a simple mechanical arrangement whereby a single pilot light will indicate whenever a unit is energized.

It is another object of my invention to provide an arrangement wherein a simple member may be operated by any one of the separate heating unit switches to operate a pilot light switch for controlling the energization of a pilot light.

Another object of my invention is to provide an electric range having a plurality of heating units controlled by a plurality of switches having operating means movable to a plurality of positions to control rates of heating of said heating units, the range also having an indicating light, an indicating light switch, and each of said switches being provided with a cam operable coincidentally with said operating means so as to engage a cam follower means for operating the indicating light switch whenever any of said switches is turned to any of said plurality of positions to control rates of heating of said heating units.

Another object of my invention is to provide an electric range having a plurality of heating units, a plurality of switches having operating means movable to a plurality of positions to control rates of heating of said heating units, an indicating light, an indicating light switch, each of said switches being provided with a cam operable coincidentally with said operating means, and cam follower means cooperating with said cams for operating the indicating light switch, said cam follower means comprising a member formed of sheet metal having a plurality of portions cooperating with said cams and a portion cooperating with said indicating light switch.

Further objects and advantages of the present invention will be apparent from the following description, reference being had to the accompanying drawings, wherein a preferred form of the present invention is clearly shown.

In the drawings:

Fig. 4 is a view in elevation of the surface unit switches in the switch bank together with the control mechanism for the pilot light, taken along the lines 4—4 of Fig. 5;

Fig. 5 is a sectional view along the lines 5—5 of Fig. 4;

Fig. 6 is a sectional view taken along the lines 6—6 of Fig. 4;

Fig. 7 is a fragmentary view showing a modified form in which the oven switch also operates the same pilot light as the surface switches.

Briefly, I have shown an electric range with a control panel having the switches arranged in a single bank. A single member is arranged to be operated by one or more of the cams provided upon each of the switches in the switch bank. This member is moved by any one of these cams whenever any of the switches of the range are turned to a position to energize one of the heating units. The movement of this member is used to operate a pilot or indicating light switch which lights the pilot or indicating light, thus providing a visible indication that commands attention for the purpose of providing a warning that one of the heating units is energized.

Figure 1:
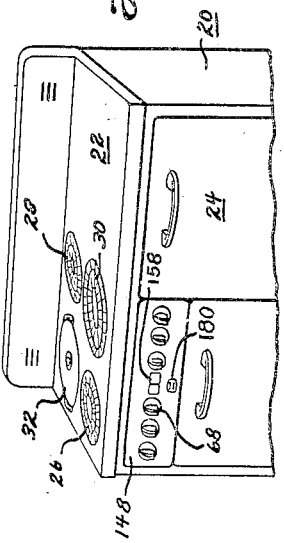
Fig. 1 is a perspective view of an electric range embodying my invention.

Referring to the drawings and more particularly to Fig. 1 there is shown an electric range 20 provided with a cooking top 22 and an oven 24. The cooking top is provided with two small surface heating units 26 and 28 rated at 1200 watts, a large surface heating unit 30, rated at 2000 watts and a deep well cooking unit 32. These units are supplied with electric energy from the three-wire Edison circuit with 230 volts across the supply conductors 64 and 66 and 115 volts across either of the conductors 64 and 66 and the neutral conductor 52.

Figure 8:
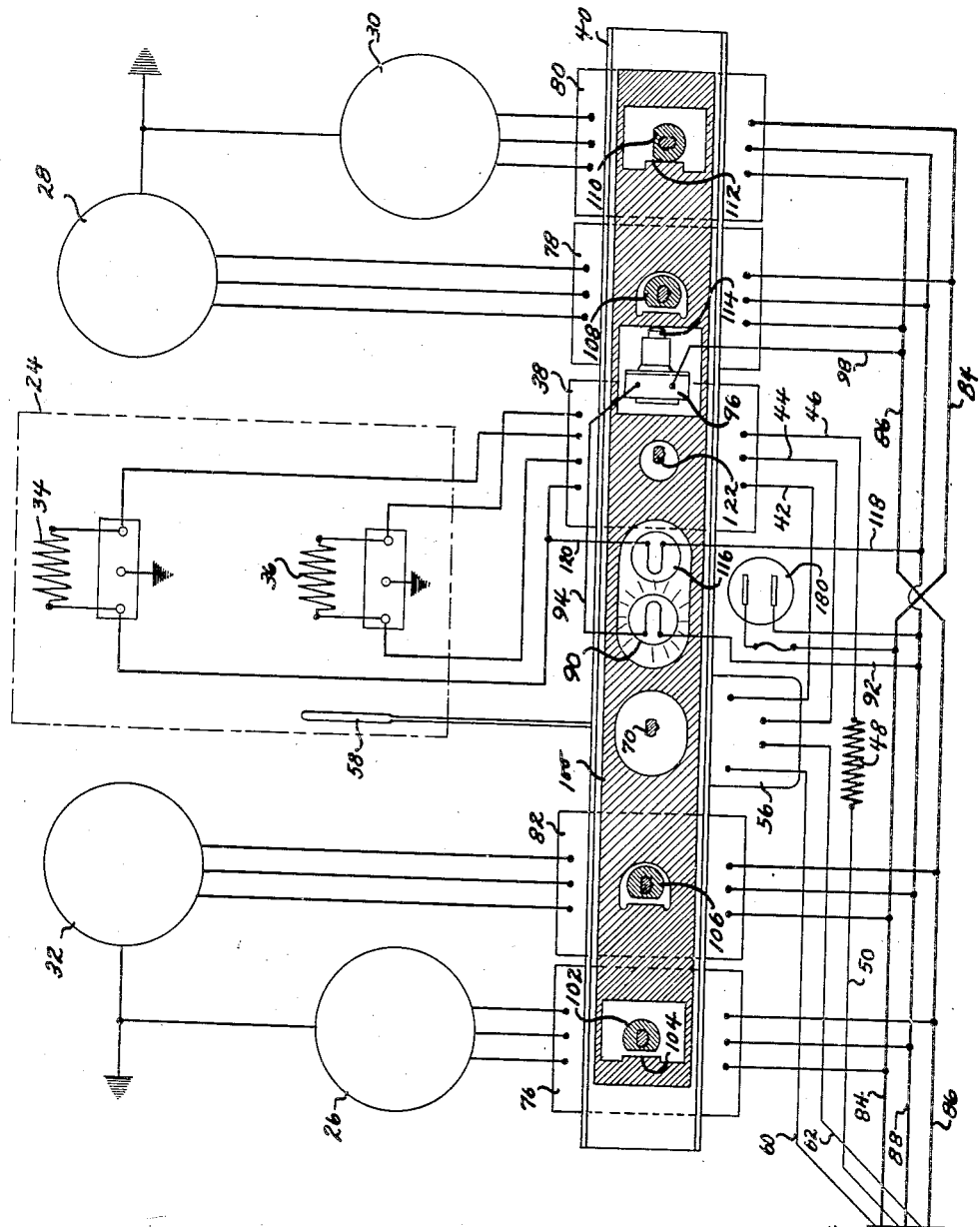
Fig. 8 is a wiring diagram together with a diagrammatic view of the pilot switch control mechanism.

As is better shown in Fig. 8, the oven 24 is provided with an upper heating unit 34 and a lower heating unit 36. These heating units are each connected by conductors to the oven control or selector switch means 38 which is mounted upon the switch supporting bar 40 of the control panel. This switch means 38 has three conductors 42, 44 and 46 extending from it. The conductor 46 is the neutral conductor and connects to an external resistance 48 which in turn is connected by a conductor 50 to a neutral conductor 52 of the terminal block 54. The conductors 42 and 44 are the high voltage conductors and connect to the switch mechanism of the oven thermostat switch 56 which has its thermostat bulb 58 located at a suitable point within the oven proper 24. The oven thermostat switch mechanism 56 is connected by two high voltage conductors 60 and 62 to the high voltage conductors 64 and 66 of the terminal block 54.

The oven selector switch means 38 can be turned to any one of four positions "off," "preheat," "bake" and "broil." In the "off" position, all connection with the conductors 42 and 44 is broken. In the "preheat" position, the upper and lower heating units 34 and 36 are connected in parallel across the high voltage conductors 42 and 44. In the "bake" position, the lower oven heating unit 36 is connected across the high voltage conductors 42 and 44 while the upper heating unit is connected across either of the high voltage conductors 42 or 44 and the third conductor 46. When the oven switch means 38 is set to the "broil" position, the upper heating unit 34 alone is connected across the high voltage conductors 42 and 44. The oven thermostat switch 56 may be set to connect and disconnect the high voltage conductors 42 and 44 with the conductors 60 and 62 at any desired temperature within the baking range. For this purpose the thermostat switch is provided with an adjusting knob 68 arranged on a shaft 70.

The three surface heating units 26, 28 and 30 are each connected by two high voltage conductors and a neutral conductor to separate switch means. The unit 26 is connected to the switch means 76, the unit 28 is connected to the switch means 78, the unit 30 is connected to the switch means 80 and the deep well cooking unit 32 is connected by two high voltage conductors and a neutral conductor to the switch means 82. These switch means are each mounted upon the supporting bar 40 in alignment with the oven selector switch means 38. Each of these switch means are connected by two high voltage or outside conductors and a neutral conductor to the high voltage conductors 84 and 86 as well as the neutral conductor 88 each of which connect to the terminal block 54.

It is undesirable to provide a pilot light in series with the electric heating units of the electric range and to connect a pilot light in parallel circuit relationship so as to indicate the use of one or more of the heating units of the range and necessitates a complicated, impractical, and expensive electrical circuit involving many switches. I have therefore provided a very simple mechanical arrangement by which the movement of any of the switches controlling the heating units of the electric range will cause a movement of a member which operates a pilot light switch to energize the pilot or indicating light.

The pilot or indicating light for the surface heating units and the deep well cooking unit is designated by the reference character 90 and is positioned substantially in the center of the panel. This pilot light 90 is connected by a conductor 92 to the neutral conductor 88, and by the conductor 94 to the pilot light switch 96. This pilot light switch in turn is connected by the conductor 98 to the conductor 86. In order to close this pilot light switch 96 whenever any of the surface heating units are energized I provide an operating bar 100, shown in section in Fig. 8. This operating bar 100 is provided with openings for receiving the operating shaft of each of the switch means fastened to the bar 40.

The switch means 76 is provided with a cam 102 upon its operating shaft which is adapted to bear against the follower surface 104 provided at one edge of the opening surrounding the cam 102. The cam 102 is D-shaped and when the switch means 76 is in the "off" position the flat portion of the cam is parallel to the flat follower surface 104. In any of the other positions of the switch means 76 the cam 102 bears against the surface 104 to move the operating bar 100 to the left. The switch means 82 for the deep well cooker 32 is provided with a similar cam 106 upon its operating shaft and is adapted to operate against a similar flat follower surface. Likewise the switch means 78 for the surface heating unit 28 is provided with a similarly shaped cam 108 which normally operates against a similar cam follower surface.

The switch means 80 for the heating unit 30 is similarly provided with a D-shaped cam 110 upon its operating shaft, which cam is shown turned so that its flat portion is turned upwardly and its rounded portion bears against the follower surface 112 of the opening surrounding the cam 110. This cam 110 is shown as holding the operating bar 100 in position wherein the operating plunger 114 of the pilot light switch 96 is held in closed position. This operating plunger 114 is spring-pressed so as to hold the operating bar against the cams. If all the cams are turned so that their flat sides engage the cam follower face the operating bar 100 will be moved to the right by the spring-pressed plunger 114 which will allow the switch mechanism of the pilot light switch 96 to move to open position thereby extinguishing the pilot or indicating light 90. However when any of the cams are turned to any other position the operating bar will be moved to the position shown in Fig. 8 thereby causing the energization of the pilot light. In this figure the oven circuit is provided with a separate pilot light 116 which is connected by a conductor 118 to the neutral conductor 88 and by the conductor 120 to the common conductor of the oven circuit. With this arrangement the pilot light 116 is lighted only when the oven circuit is energized in any manner and the pilot light 90 will only be energized when one of the surface heating units is energized. However, in Fig. 7 I have shown a modification in which the operating shaft 122 of the oven selector switch means 38 is provided with a D-shaped cam 222 and operates in an opening 224 in the operating bar 200 which is provided with a cam follower surface similar to the cam follower surfaces provided for the switch means for controlling the surface heaters.

Figure 3:
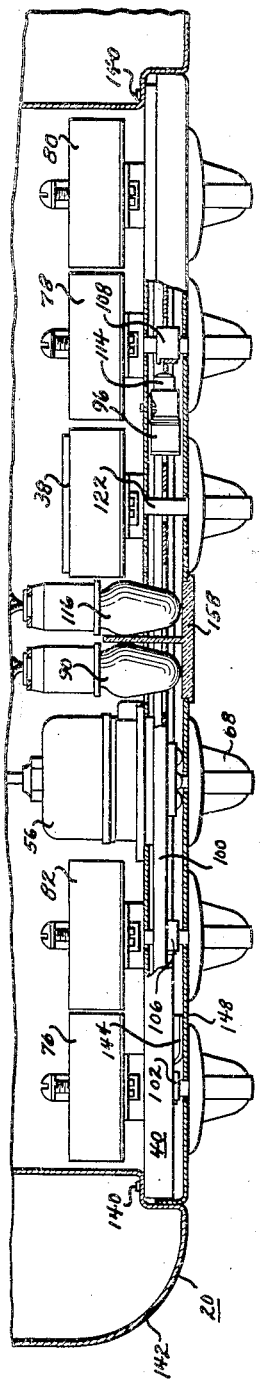
Fig. 3 is a top sectional view of the switch bank of the control panel.
Figure 2:
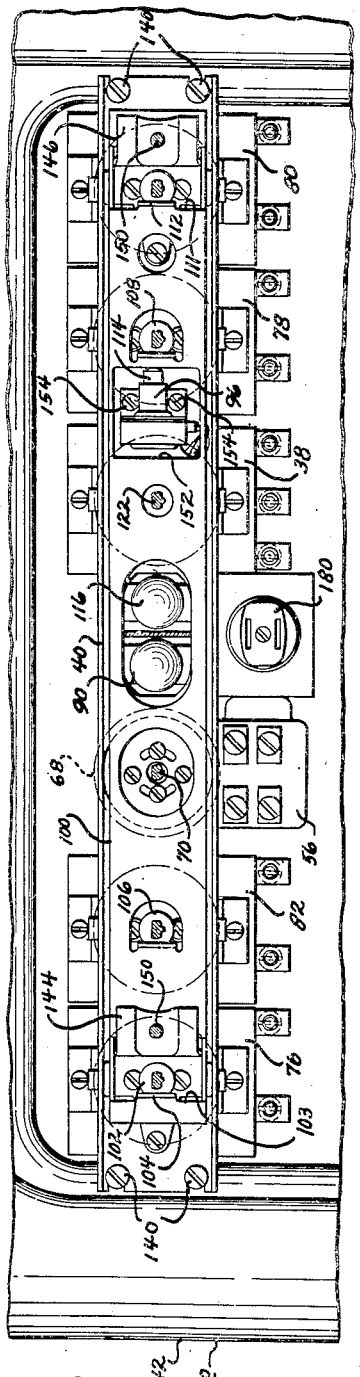
Fig. 2 is a front view of the switch bank of the control panel of the electric range shown in Fig. 1.

Figs. 2 to 6 of the drawings show structurally the diagrammatic arrangement found in Fig. 8. As shown in Figs. 2 and 3 the switch bar 40 is channel-shaped in cross-section and is fastened at either end by the screws 140 to the shell 142 of the range. Fastened to this channel-shaped switch bar 40 are two brackets 144 and 146 which are Z-shaped in cross-section and extend forwardly to the face member 148 of the control panel which is fastened to these brackets by small screws 150. The operating bar 100 is also channel-shaped and is provided with square shaped openings 103 and 111 at its ends. The opening 103 receives the mid-portion of the bracket 144 which provides a sliding support for the upper flange at the adjacent end of the channel-shaped operating bar 100 and the opening 111 similarly receives the mid-portion of the bracket 146 which similarly supports the upper flange at the other end of the operating bar 100. This operating bar 100 is thus provided with a sliding support at each end.

As shown best in Figs. 4 and 5 the cam follower surfaces 104 and 112 as well as the remaining cam follower surfaces are formed of a lip which is struck out from a web portion of the operating bar 100. The cams are each shown as being formed from a circular collar and provided with a flat portion on one side which, however, does not extend entirely through the entire thickness of the cam. The pilot light switch 96 is positioned within a square aperture 152 provided in the central portion of the bar, which is adequate in size to allow free movement of the operating bar 100. The pilot light switch is fastened by screws 154 to the switch supporting bar 40. The spring pushes the plunger 114 of the pilot light switch against the edge of the opening 152 plainly shown in Fig. 4.

The switches are each provided with operating knobs upon the portion of their operating shafts which extend through apertures in the face member 148. The face member 148 is also provided with a window 158 which permits the light from either of the pilot lights 90 or 116 to be visible. A shield is provided between the two pilot lights so as to prevent any confusion of indication.

In Fig. 7, as mentioned heretofore, there is shown a modification in which the operating shaft 122 of the oven selector switch 38 is provided with a cam 222 which operates within a D-shaped aperture 224 provided in an operating bar 200 which is similar and is used in a switch bank which is similar in all other respects to the other figures of this application. In this modified form only one pilot light is required for the electric range to show that all of the surface and oven heating unit controlling switches are in the "off" position, since by this arrangement the movement of the oven selector switch 38 away from the "off" position will cause the cam 222 on the shaft 122 of this oven selector switch 38 to move the operating bar 200 to the left so as to cause the pilot or indicating light switch to be closed to indicate that one of the heating units of the electric range is energized. Thus, in this modified form, the oven switch as well as the switches for the surface heaters is provided with a cam for moving the operating bar to close the pilot light switch to light the pilot or indicating light. Therefore, by this arrangement, when the pilot light 90 is not lighted this will indicate that neither the surface nor the oven heating units is energized and that even the closing of the oven thermostatic switch cannot energize the oven heating units while the lighting of the pilot light 90 will indicate that either one or more of the surface heating units is energized and/or that the oven heating units are energized or are capable of being energized by the closing of the oven thermostat switch.

The pilot light 116 will not be rendered useless by the arrangement including the modification with Fig. 7 since it will be lighted and extinguished as the oven heating units 34 and 36 are energized and deenergized by the closing and opening of the oven thermostat switch 56 while the pilot light 90 remains lighted continuously. This pilot light 116 is particularly useful to indicate the end of the preheating period of the oven. When the oven selector switch 38 and the oven thermostat switch 56 are first turned "on", the pilot light 116 will be lighted, thereby indicating that energy is flowing to one of the heating units of the oven. This pilot light as in the first described modification will remain energized as long as this flow of energy to the oven heating units continues. This flow of energy will continue as long as the temperature of the oven is below the desired temperature for which the oven thermostat switch 38 is set. When the desired temperature is reached, the oven thermostat switch 38 will open and deenergize the oven heating units and the pilot light will be extingushed indicating that the oven is up to the temperature for which the oven thermostat switch 38 is set. The pilot light 90, however, will remain lighted throughout, even during the time the oven heating units are temporarily deenergized by the cycling of the oven thermostat switch, thus giving a warning that the oven selector switch 38 must be turned to the "off" position before the electric range can be considered safely deenergized and the matter dismissed from the mind.

The switch bar 40 is provided with an appliance receptacle 180 which is fastened to its lower flange. This appliance receptacle is connected across the conductors 84 and 88 and requires no pilot light, since it is in operation only when an appliance is plugged into it.

While the form of embodiment of the invention as herein disclosed, constitutes a preferred form, it is to be understood that other forms might be adopted, all coming within the scope of the claims which follow.

What is claimed is as follows:

1. A device of the character described, comprising a base, an outwardly directed channel-shaped switch bar secured to said base, outwardly directed brackets secured to said switch bar, switches behind said switch bar, switch stems extending forwardly through said switch bar, cams on said stems, an operating bar having openings at its ends for support on said brackets, said operating bar having cam surfaces engaging said cams, a pilot light switch operated by said operating bar, a face member having openings for said switch stems, and secured to said brackets, and switch operating knobs in front of said face member carried by said switch stems.

2. A device of the character described, comprising a base, a switch bar secured to said base, switches behind said switch bar, switch stems extending forwardly through said switch bar, cams on said stems, an operating bar slidably mounted on said switch bar and having cam surfaces engaging said cams, a pilot light switch closed by said operating bar whenever any of said first named switches are closed, a face member having openings for said switch stems and secured to said base, and switch operating knobs in front of said face member carried by said switch stems.

3. An electric range comprising an oven, a surface heating unit, an oven heating unit, a manually operable surface heating unit switch means, manually operable oven heating unit switch means, pilot light means energized by the closing of any one of said switch means, said pilot light means being provided with a lost motion connection with each one of said switch means constructed and arranged so that when any one of said switch means is moved from its circuit open position to a circuit closing position said pilot light means is energized whereupon any one of and all of the remainder of said switch means may be operated from circuit open position to circuit closing position without affecting said pilot light means, and said pilot light means being deenergized by the last one of the switch means that is returned to circuit open position, thermostatically operable oven heating unit switch means for thermostatically controlling the oven heating unit while said manually operable oven heating unit switch means is closed, and a signalling device energized by the closing and deenergized by the opening of said thermostatic switch means.

4. In an electric range and the like, a plurality of multiple position switches, a control element for each of said switches operable from a circuit open position to a circuit closing position, a pilot lamp, a switch controlling the energization of said pilot lamp, a single operating member for said switch, and a driving connection between each one of said control elements and said single operating member constructed and arranged so that when any one of said control elements is moved from its circuit open position to a circuit closing position said pilot lamp control member is operated to energize said lamp, whereupon any one of and all of the remainder of said control elements may be operated from circuit open position to circuit closing position without affecting said pilot lamp control member or the previously operated control element or elements, and said pilot lamp control member being moved to its position to deenergize said pilot lamp by the last of said control elements that is returned to its circuit open position.

5. In an electric range and the like having a plurality of multiple position controlling switches, each having a control member movable from an "off" position to a plurality of circuit controlling positions, a pilot lamp, a switch controlling said pilot lamp, a slide bar for operating said switch movable in one direction to close said switch to energize said lamp and in the opposite direction to open said switch to deenergize said lamp, means biasing said slide bar in said latter direction, and each of said control members operating a cam surface that coacts with said slide bar to move it against said biasing means to cause said switch to energize said lamp when a control member is moved from its "off" position to a circuit closing position and to permit said bar to move to open said switch to deenergize said lamp when said control member is returned to its "off" position, the coaction between said slide bar and said cam surfaces providing for movement of any one of or all of said control members from their "off" positions to any of their circuit closing positions without operating said slide bar after the first of said control members has been operated from its "off" position and without affecting the operating of said control element that has first been operated.

WILLIAM SMITH, Jr.